US010625701B2

United States Patent
Cho et al.

(10) Patent No.: US 10,625,701 B2
(45) Date of Patent: Apr. 21, 2020

(54) VEHICLE AIRBAG

(71) Applicant: Ford Global Technologies, LLC, Dearborn, MI (US)

(72) Inventors: Jaeho Cho, Southfield, MI (US); Robert William McCoy, Ann Arbor, MI (US); Mangala Ambalangodage Jayasuriya, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

(21) Appl. No.: 15/862,328

(22) Filed: Jan. 4, 2018

(65) Prior Publication Data

US 2019/0202391 A1 Jul. 4, 2019

(51) Int. Cl.
| | |
|---|---|
| *B60R 21/214* | (2011.01) |
| *B60R 21/233* | (2006.01) |
| *B60N 2/01* | (2006.01) |
| *B60R 21/231* | (2011.01) |
| *B60R 21/2338* | (2011.01) |

(52) U.S. Cl.
CPC .......... *B60R 21/214* (2013.01); *B60R 21/233* (2013.01); *B60N 2/01* (2013.01); *B60R 2021/23107* (2013.01); *B60R 2021/23161* (2013.01); *B60R 2021/23382* (2013.01); *B60R 2021/23386* (2013.01)

(58) Field of Classification Search
CPC ... B60R 21/214; B60R 21/232; B60R 21/233; B60R 2021/23386; B60R 2021/23382; B60R 2021/23161; B60R 2021/23107; B60N 2/01
See application file for complete search history.

(56) References Cited

U.S. PATENT DOCUMENTS

| | | | | |
|---|---|---|---|---|
| 4,468,051 A | * | 8/1984 | Kobayashi | B60N 2/143 280/751 |
| 8,393,637 B2 | | 3/2013 | Choi et al. | |
| 8,807,593 B2 | | 8/2014 | Lee et al. | |
| 9,340,126 B2 | | 5/2016 | Cuddihy et al. | |
| 9,707,921 B2 | * | 7/2017 | Fischer | B60R 21/231 |
| 2005/0023806 A1 | * | 2/2005 | Higuchi | B60R 21/231 280/730.1 |
| 2006/0214401 A1 | * | 9/2006 | Hirata | B60R 21/232 280/730.1 |

(Continued)

FOREIGN PATENT DOCUMENTS

| | | |
|---|---|---|
| CN | 105644489 A | 6/2016 |
| CN | 106740645 A | 5/2017 |

(Continued)

*Primary Examiner* — Frank B Vanaman
(74) *Attorney, Agent, or Firm* — Frank A. MacKenzie; Bejin Bieneman PLC

(57) ABSTRACT

A vehicle includes a roof. The vehicle includes a front seat and a rear seat facing each other. The vehicle includes an airbag inflatable from the roof to an inflated position between the front seat and the rear seat. The airbag, in the inflated position, includes a first inflated leg, a second inflated leg spaced from the first inflated leg, and an inflated arced member extending from the first inflated leg to the second inflated leg, the inflated arced member including a top panel and a bottom panel spaced from each other and each arcing downwardly.

19 Claims, 13 Drawing Sheets

(56) References Cited

U.S. PATENT DOCUMENTS

| | | | |
|---|---|---|---|
| 2012/0119473 A1* | 5/2012 | Lee | B60R 21/231 |
| | | | 280/728.2 |
| 2012/0133114 A1* | 5/2012 | Choi | B60R 21/214 |
| | | | 280/728.2 |
| 2015/0142247 A1* | 5/2015 | Rao | B60R 21/20 |
| | | | 701/23 |
| 2017/0028876 A1* | 2/2017 | Yamada | B60N 2/012 |
| 2018/0222432 A1* | 8/2018 | Schneider | B60R 21/214 |
| 2019/0193666 A1* | 6/2019 | Jost | B60R 21/232 |

FOREIGN PATENT DOCUMENTS

| | | |
|---|---|---|
| KR | 20130110296 A | 10/2013 |
| WO | 200450435 A1 | 6/2004 |

\* cited by examiner

VEHICLE AIRBAG

BACKGROUND

A vehicle may include one or more airbags deployable during vehicle impacts to absorb energy from occupants of the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
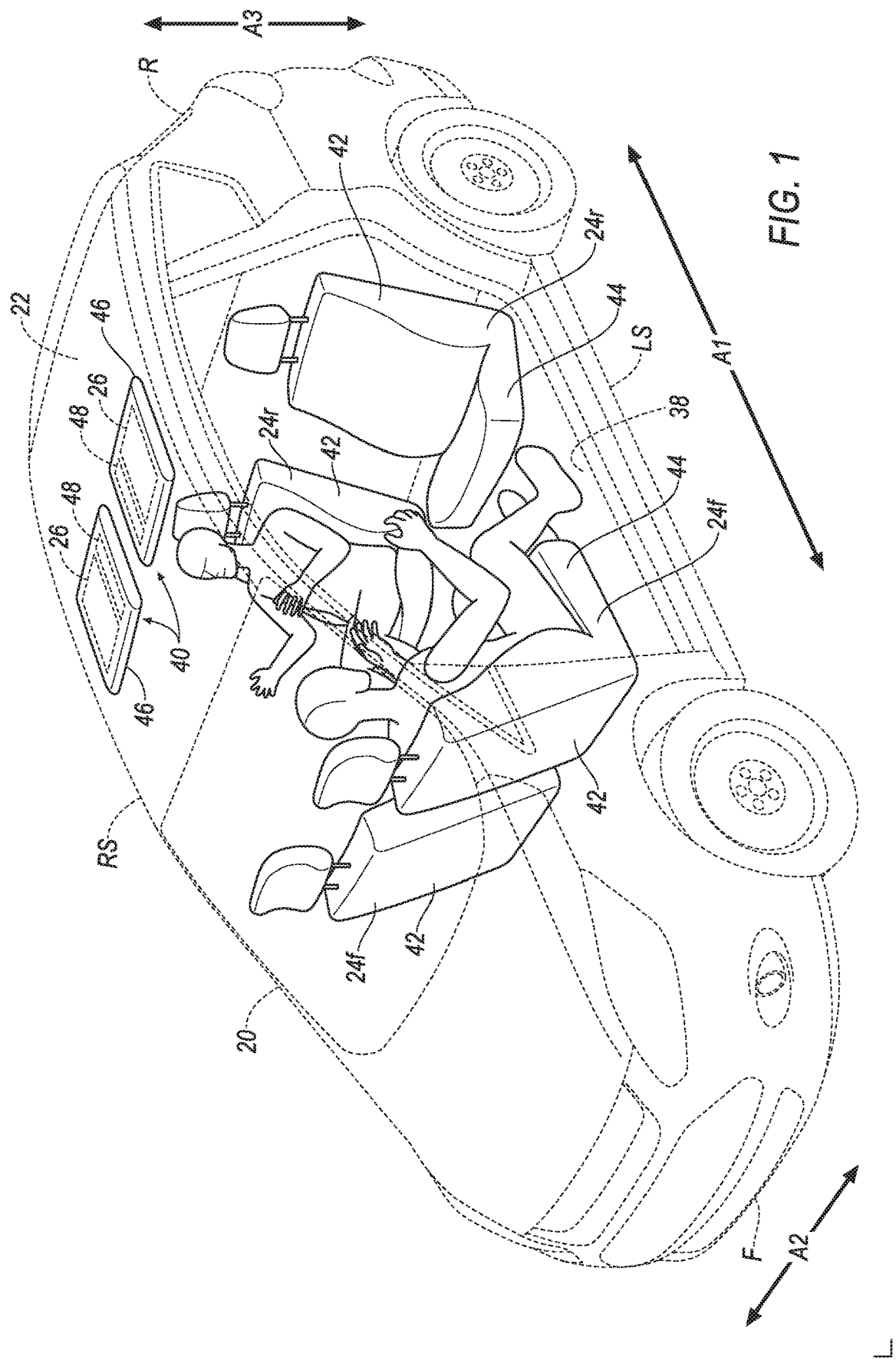
FIG. 1 is a perspective view of a vehicle having an airbag assembly with an airbag in an uninflated position.

A vehicle includes a roof. The vehicle includes a front seat and a rear seat facing each other. The vehicle includes an airbag inflatable from the roof to an inflated position between the front seat and the rear seat. The airbag, in the inflated position, includes a first inflated leg, a second inflated leg spaced from the first inflated leg, and an inflated arced member extending from the first inflated leg to the second inflated leg, the inflated arced member including a top panel and a bottom panel spaced from each other and each arcing downwardly.

The front seat and the rear seat may be spaced from each other along a vehicle-longitudinal axis, and the first inflated leg and second inflated leg may be spaced from each other along a cross-vehicle axis transverse to the vehicle-longitudinal axis.

The top panel and the bottom panel may each extend from the first inflated leg to the second inflated leg.

The airbag may include a common inflation chamber extending through the first inflated leg, the second inflated leg, and the inflated arced member.

The first inflated leg may have a first proximal end and the second inflated leg may have a second proximal end, the first proximal end and the second proximal end being adjacent the roof and spaced from each other.

The first and second inflated legs may have distal ends spaced from the first proximal end and the second proximal end, the distal ends being fixed to the inflated arced member.

The vehicle may include a floor, and the top panel may face the roof and the bottom panel may face the floor.

A gap may be defined by the roof, the first inflated leg, the second inflated leg, and the inflated arced member.

The airbag in the inflated position may be spaced from both the front seat and the rear seat.

The first inflated leg may include a first chamber, the second inflated leg may include a second chamber, and the inflated arced member may include an arced chamber, and the airbag may include tethers disposed in at least one of the first chamber, the second chamber, and the arced chamber.

The vehicle may include tethers extending from the first and second inflated legs to the roof.

The first and second inflated legs may each include a proximal end adjacent the roof and a distal end spaced from the roof, and the first and second inflated legs may extend in a vehicle-rearward direction from the proximal end to the distal end.

The first and second inflated legs may each include a front panel having a first length and a rear panel having a second length that is less than the first length.

The first and second inflated legs may each include a top panel having a center portion fixed relative to the roof and an end portion free from being fixed relative to the roof.

An airbag assembly includes an airbag inflatable to an inflated position. The airbag, in the inflated position, includes a first inflated leg, a second inflated leg spaced from the first inflated leg, and an inflated arced member extending from the first inflated leg to the second inflated leg, the inflated arced member including a top panel and a bottom panel spaced from each other and each arcing downwardly.

The first inflated leg may have a first proximal end and the second inflated leg may have a second proximal end, the first proximal end and the second proximal end being spaced from each other.

A gap may be defined by the first inflated leg, the second inflated leg, and the inflated arced member.

The first inflated leg may include a first chamber, the second inflated leg may include a second chamber, and the inflated arced member may include an arced chamber, the first chamber, the second chamber, and the arced chamber all being in fluid communication with one another.

The airbag may include tethers disposed in at least one of the first chamber, the second chamber, and the arced chamber.

The top panel and the bottom panel may extend from the first inflated leg to the second inflated leg.

With reference to the Figures, wherein like numerals indicate like parts throughout the several views, a vehicle 20 includes a roof 22. The vehicle 20 includes a front seat 24*f* and a rear seat 24*r* facing each other. The vehicle 20 includes an airbag 26 inflatable from the roof 22 to an inflated position between the front seat 24*f* and the rear seat 24*r*. The airbag 26, in the inflated position, includes a first inflated leg 28, a second inflated leg 30 spaced from the first inflated leg 28, and an inflated arced member 32 extending from the first inflated leg 28 to the second inflated leg 30, the inflated arced member 32 including a top panel 34 and a bottom panel 36 spaced from each other and each arcing downwardly.

The airbag 26 may provide protection for an occupant of either seat 24*f*, 24*r*, the airbag 26 may deploy with less inflation gases as compared to other airbag designs, and the airbag 26 may protect the occupant without necessarily requiring a reaction surface, such as a seat, a pillar, an instrument panel, etc., behind the airbag 26.

The vehicle 20, shown in FIGS. 1-5, 8-11, and 13, may be any passenger or commercial automobile such as a car, a truck, a sport utility vehicle, a crossover vehicle, a van, a minivan, a taxi, a bus, etc. The vehicle 20 may include one or more seats 24f, 24r, the roof 22, a floor 38, one or more airbag assemblies 40, etc. The vehicle 20 defines a vehicle-longitudinal axis A1, i.e., extending between a front F and a rear R of the vehicle 20. The vehicle 20 defines a cross-vehicle axis A2 that is transverse to the vehicle-longitudinal axis A1, e.g., extending between a left-side LS and a right-side RS of the vehicle 20. The vehicle 20 defines a vehicle-vertical axis A3, i.e., extending between the roof 22 and the floor 38 of the vehicle 20. The vehicle-longitudinal axis A1, the cross-vehicle axis A2, and the vehicle-vertical axis A3 may all be perpendicular to each other. The directions front F, rear R, left-side LS, and right-side RS are all relative to an orientation of an operator of the vehicle 20, an orientation of controls for operating the vehicle 20, e.g., an instrument panel, etc., a forward driving direction when wheels of the vehicle 20 are all parallel with each other, etc.

The roof 22 provides cover for occupants for the vehicle 20. The roof 22 may include an internal panel, an exterior panel, and a headliner. The internal panel provides support to the exterior panel, the headliner, etc. The internal panel may be made of steel, aluminum, carbon fiber, or any other suitable material. The headliner and the exterior panel provide class-A surfaces to the roof 22, i.e., surfaces specifically manufactured to have a high-quality, finished aesthetic appearance free of blemishes, etc.

The floor 38, supports components of the vehicle 20, such as the seats 24f, 24r. The floor 38 can include, beams, panels, etc. The floor 38 can be metal, plastic, or any other suitable material, including combinations thereof.

Each of the seats 24f, 24r may include a seat back 42, a seat bottom 44, and a headrest. The headrest may be supported by the seat back 42 and may be stationary or movable relative to the seat back 42. The seat back 42 may be supported by the seat bottom 44 and may be stationary or movable relative to the seat bottom 44. The seat back 42, the seat bottom 44, and/or the headrest may be adjustable in multiple degrees of freedom. Specifically, the seat back 42, the seat bottom 44, and/or the headrest may themselves be adjustable, in other words, adjustable components within the seat back 42, the seat bottom 44, and/or the headrest, and/or may be adjustable relative to each other.

The seats 24f, 24r may be positioned to face each other. For example, one of the seats 24f, 24r may be the front seat 24f that faces the rear R of the vehicle 20 and another of the seats 24f, 24r may be the rear seat 24r that faces the front F of the vehicle 20. To put it another way, the seat bottoms 44 may be between the seat backs 42 of the seats 24f, 24r. The seats 24f, 24r may be spaced from each other along the vehicle-longitudinal axis A1. For example, the front seat 24f may be closer to the front F of the vehicle 20 than the rear seat 24r.

The airbag assembly 40 may include the airbag 26, a housing 46 supporting the airbag 26, and an inflator 48 in communication with the airbag 26 for inflating the airbag 26 from an uninflated position to the inflated position. The airbag assembly 40 may be supported by the roof 22 of the vehicle 20.

The airbag 26, shown in FIGS. 1-12, may be formed of a woven polymer or any other material. As one example, the airbag 26 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 2:
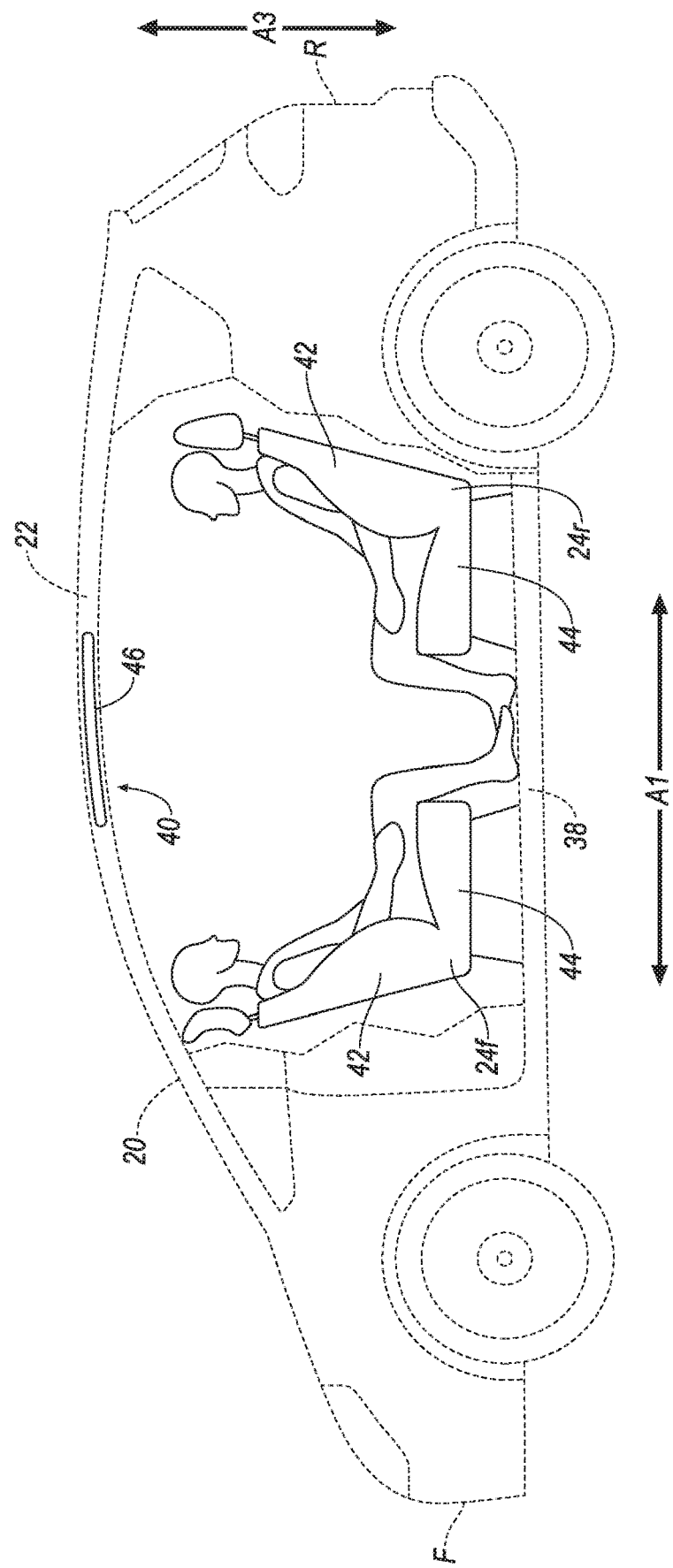
FIG. 2 is a side view of the vehicle of FIG. 1.
Figure 3:
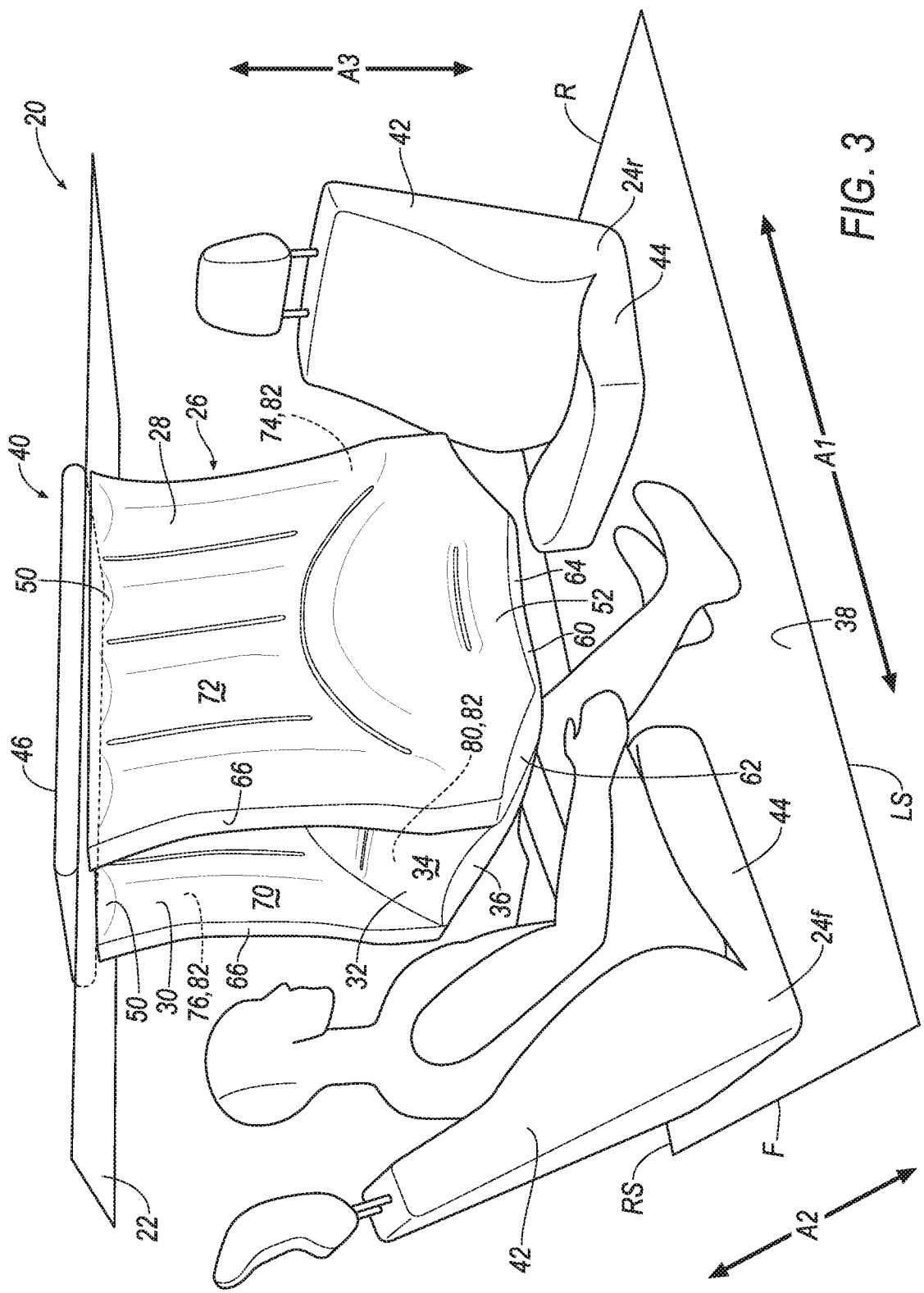
FIG. 3 is a perspective view of an interior of the vehicle of FIG. 1 with the airbag in an inflated position and an occupant in a front seat.

The airbag 26 is inflatable from the uninflated position, shown in FIGS. 1 and 2, to the inflated position, shown in FIGS. 3-12. The airbag 26 may inflate from the roof 22 to between the front seat 24f and the rear seat 24r. For example, the airbag 26 in the inflated position may be between the seats 24f, 24r in a direction along the vehicle-longitudinal axis A1, i.e., on or offset from the vehicle-longitudinal axis A1. The airbag 26 in the inflated position is spaced from both the front seat 24f and the rear seat 24r, e.g., along the vehicle-longitudinal axis A1. The airbag 26 in the inflated position may restrain an occupant of the front seat 24f or the rear seat 24r, e.g., depending on a direction of an impact to the vehicle 20, e.g., whether the impact is to the front F of the vehicle 20 or to the rear R of the vehicle 20.

The airbag 26 in the inflated position includes the first inflated leg 28 and the second inflated leg 30. The second inflated leg 30 is spaced from the first inflated leg 28. The inflated legs 28, 30 may be spaced from each other along the cross-vehicle axis A2. For example, the first inflated leg 28 may be closer to the left-side LS of the vehicle 20 than the second inflated leg 30.

The first inflated leg 28 and the second inflated leg 30 may each have a proximal end 50. The proximal end 50 may be adjacent the roof 22. For example, the proximal ends 50 may abut the housing 46. To put it another way, the airbag 26 may be supported by the housing 46 at the proximal ends 50. The proximal end 50 of the first inflated leg 28 and the proximal end 50 of the second inflated leg 30 may be spaced from each other, e.g., along the cross-vehicle axis A2.

The first inflated leg 28 and the second inflated leg 30 may each have a distal end 52. The distal ends 52 may be spaced from the proximal ends 50. For example, the distal end 52 of the first inflated leg 28 may be spaced the proximal end 50 of the first inflated leg 28, and the distal end 52 of the second inflated leg 30 may be spaced from the distal end 52 of the second inflated leg 30, e.g., along the vehicle-vertical axis A3. The distal ends 52 may be spaced from the housing 46. The distal ends 52 may be spaced from the roof 22, e.g., along the vehicle-vertical axis A3. To put it another way, the proximal ends 50 may be between the distal ends 52 and the roof 22 and/or the housing 46.

Figure 10:
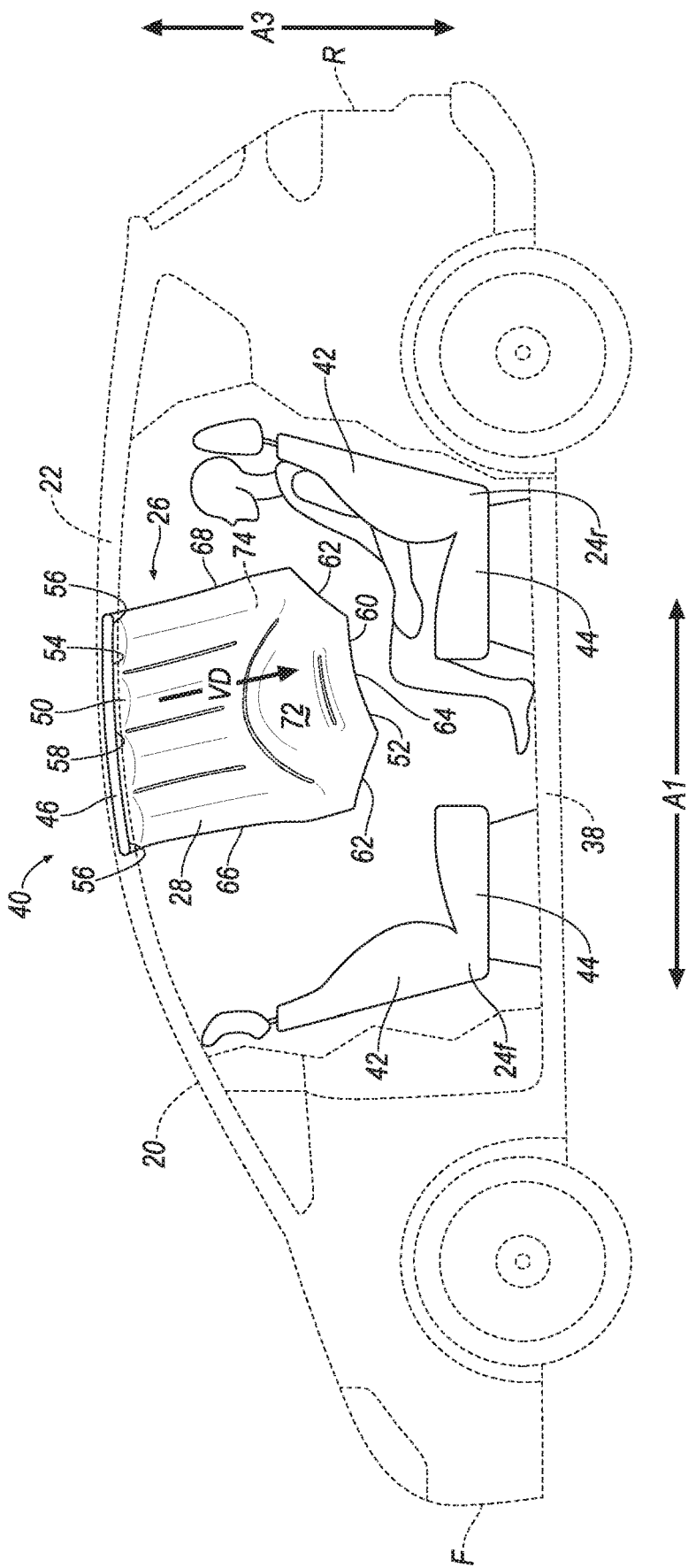
FIG. 10 is a side view of the vehicle of FIG. 9.

The first inflated leg 28 and second inflated leg 30 may extend in a vehicle-rearward direction VD from the proximal end 50 to the distal end 52, as shown in FIG. 10. To put it another way, the distal ends 52 may be closer to the floor 38 and the rear R of the vehicle 20 than the proximal ends 50.

Figure 4:
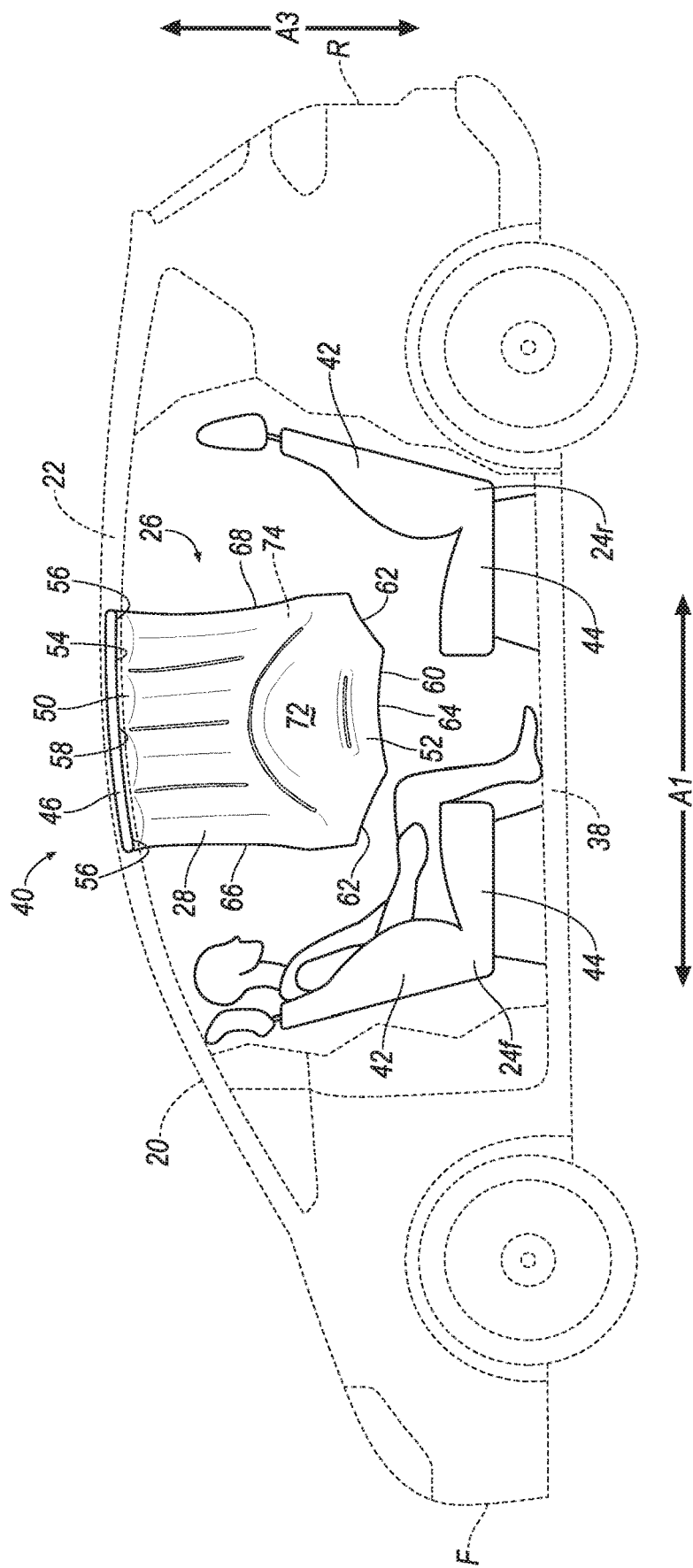
FIG. 4 is a side view of the vehicle of FIG. 3.
Figure 11:
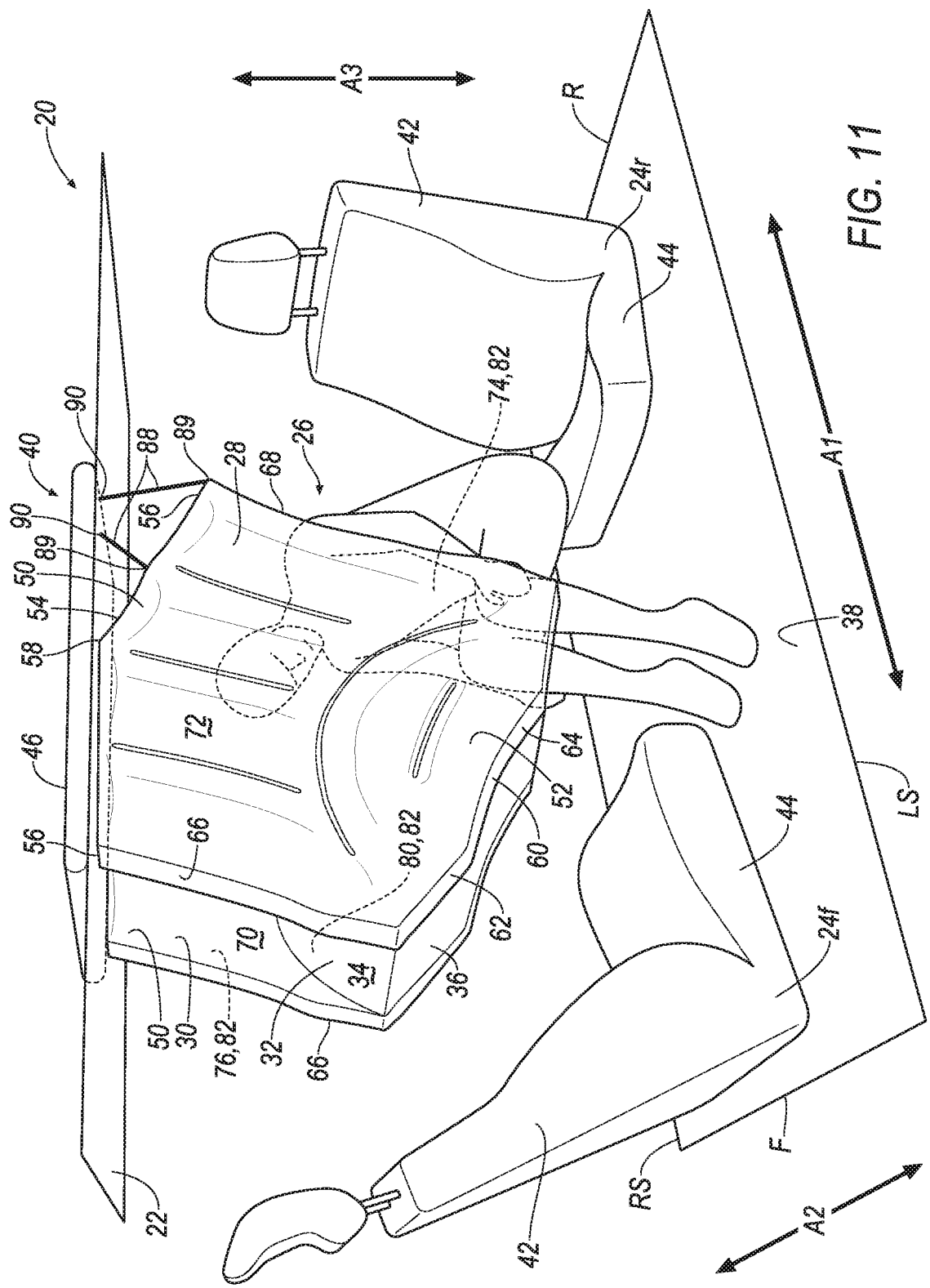
FIG. 11 is a perspective view of the interior of the vehicle of FIG. 9 during a vehicle front impact.
Figure 12:
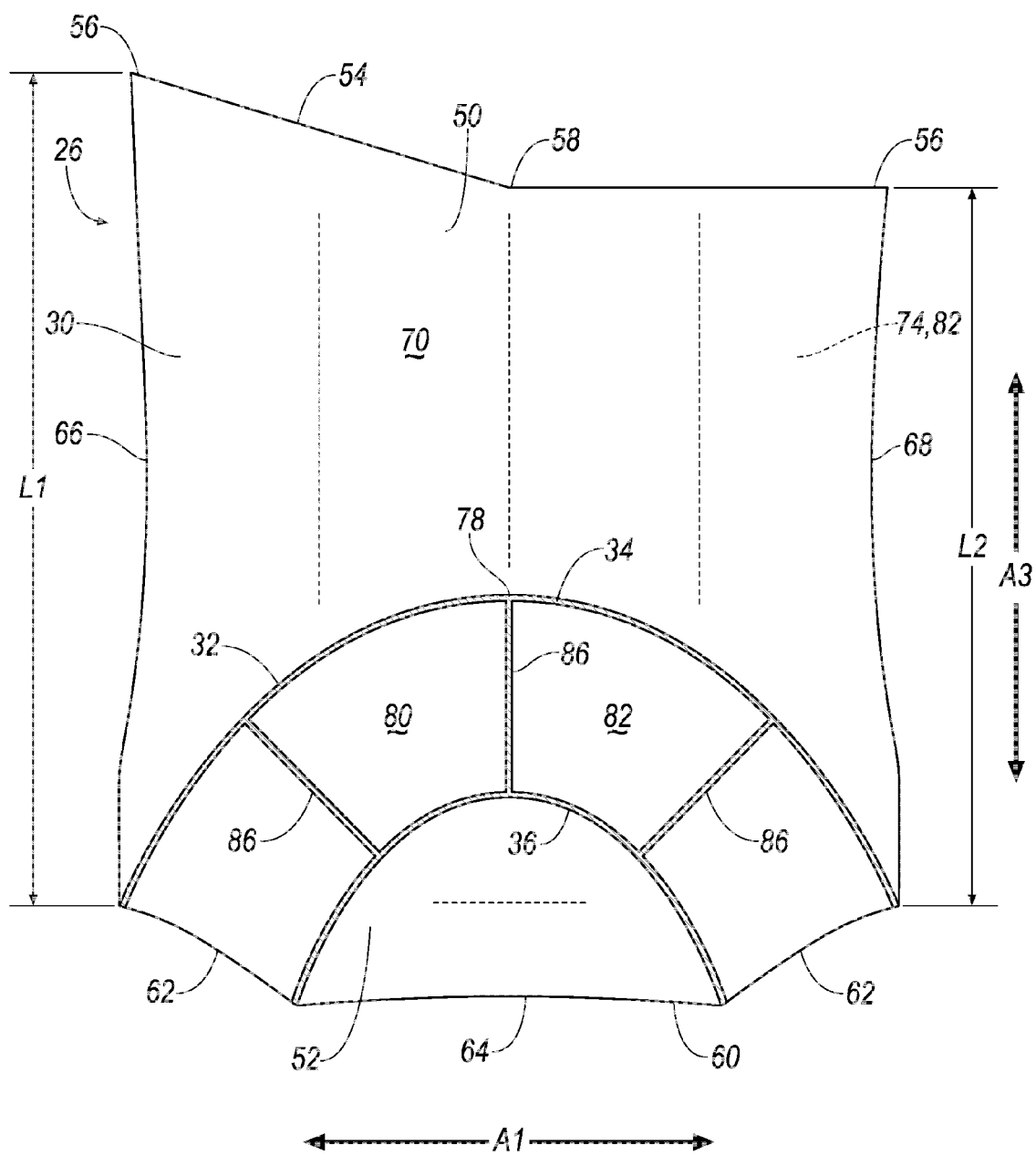
FIG. 12 is a cross-section view of the airbag of FIG. 9 taken along the cross-vehicle axis.

The first inflated leg 28 and the second inflate leg may each include a top panel 54. The top panels 54 may be at the proximal ends 50. Each top panel 54 have a pair of opposing end portions 56 and a center portion 58 between the end portions 56. The center portions 58 may be fixed relative to the roof 22, e.g., the center portions 58 may be fixed to the housing 46 with a fastener, adhesive, etc. The end portions 56 may extend from the center portions 58, e.g., along the vehicle-longitudinal axis A1. The end portions 56 of each top panel 54 may be transverse to each other, as shown in FIG. 12. One or more of the end portions 56 may be free from being fixed relative to the roof 22, e.g., one or more of the end portions 56 may be free from being directly fixed to the housing 46 or the roof 22, as shown in FIGS. 4 and 11. To put it another way, one or more of the end portions 56 may be free to move away from the roof 22 and the housing 46, and the center portion 58 may be directly fixed to the housing 46 and/or the roof 22 and not free to move away from the roof 22.

The first inflated leg 28 and the second inflated leg 30 may each include a bottom panel 60. The bottom panels 60 may be at the distal ends 52. The bottom panels 60 may be spaced from the top panels 54, e.g., along the vehicle-vertical axis A3. Each bottom panel 60 may include a pair of opposing end portions 62 and a center portion 64 between the end portions 62. The end portions 62 may extend transversally from the center portion 64, e.g., toward the front F or rear R of the vehicle 20, and toward the roof 22.

The first inflated leg 28 and second inflated leg 30 each may include a front panel 66 and a rear panel 68, e.g., relative to the front F and the rear R of the vehicle 20. The front panel 66 may be spaced from the rear panel 68 along the vehicle-longitudinal axis A1. The front panel 66 and the rear panel 68 may extend from the top panel 54 to the bottom panel 60. The front panel 66 may have a first length L1, shown in FIG. 12. The rear panel 68 may have a second length L2, shown in FIG. 12. The first length L1 and second length L2 may be between the top panel 54 and the bottom panel 60 at the respective front panel 66 or rear panel 68. The first length L1 and second length L2 may be between the proximal end 50 and the distal end 52 at the respective front panel 66 or rear panel 68. The second length L2 may be less than the first length L1. Having the second length L2 less than the first length L1 aids in the first inflated leg 28 and second inflated leg 30 extending in the vehicle-rearward direction VD from the proximal end 50 to the distal end 52.

The first inflated leg 28 and the second inflated leg 30 may each include an inner panel 70 and an outer panel 72, e.g. relative to a center of the airbag 26. To put it another way, the inner panel 70 of the first inflated leg 28 may be closer to the second inflated leg 30 than the outer panel 72 of the first inflated leg 28, and the inner panel 70 of the second inflated leg 30 may me closer to the first inflated leg 28 than the outer panel 72 of the second inflated leg 30. The inner panel 70 may extend downward from the top panel 54 the inflated arced member 32. The outer panel 72 may extend from the top panel 54 to the bottom panel 60. The inner panel 70 and the outer panel 72 may extend from the front panel 66 to the rear panel 68.

The top panel 54, the bottom panel 60, the front panel 66, the rear panel 68, the inner panel 70, and/or the outer panel 72 may be monolithic, i.e., a single continuous sheet of fabric. The top panel 54, the bottom panel 60, the front panel 66, the rear panel 68, the inner panel 70, and/or the outer panel 72 may be fixed, directly or indirectly, to each other, e.g., via stitching, adhesive, friction welding, etc. The top panel 54, the bottom panel 60, the front panel 66, the rear panel 68, the inner panel 70, and/or the outer panel 72 may be a combination thereof, e.g., some of the panels 54, 60, 66, 68, 70, 72 may be monolithic with each other, and other of the panels 54, 60, 66, 68, 70, 72 may be separately formed and subsequently fixed to each other.

The first inflated leg 28 may include a first chamber 74. The first chamber 74 may be defined by the top panel 54, the bottom panel 60, the front panel 66, the rear panel 68, the inner panel 70, and/or the outer panel 72 of the first inflated leg 28. For example, the first chamber 74 may be between the top panel 54 and the bottom panel 60, the front panel 66 and the rear panel 68, and/or the inner panel 70 and the outer panel 72 of the first inflated leg 28.

The second inflated leg 30 may include a second chamber 76. The second chamber 76 may be defined by the top panel 54, the bottom panel 60, the front panel 66, the rear panel 68, the inner panel 70, and/or the outer panel 72 of the second inflated leg 30. For example, the second chamber 76 may be between the top panel 54 and the bottom panel 60, the front panel 66 and the rear panel 68, and/or the inner panel 70 and the outer panel 72 of the second inflated leg 30.

The inflated arced member 32 extends from the first inflated leg 28 to the second inflated leg 30, e.g., along the vehicle-longitudinal axis A1. The inflated arced member 32 may be supported by the first inflated leg 28 and the second inflated leg 30. For example, the distal ends 52 of the first inflated leg 28 and the second inflated leg 30 may be fixed to the inflated arced member 32, e.g., via stitching, adhesive, friction welding, etc. For example, the inflated arced member 32, the first inflated leg 28, and/or the second inflated leg 30 may be monolithic.

The inflated arced member 32 may include the top panel 34 and the bottom panel 36. The top panel 34 and the bottom panel 36 may be spaced from each other, e.g., along the vehicle-vertical axis A3. The top panel 34 and bottom panel 36 may each arc downwardly. For example, the top panel 34 and the bottom panel 36 may define an apex 78 and arcuately extend from the apex 78 toward the front F and the rear R of the vehicle 20 and toward the floor 38. The top panel 34 and the bottom panel 36 of the inflated arced member 32 may be monolithic. The top panel 34 and the bottom panel 36 may be fixed to each other, e.g., via stitching, adhesive, friction welding, etc.

The top panel 34 and the bottom panel 36 of the inflated arced member 32 each extend from the first inflated leg 28 to the second inflated leg 30, e.g., along the cross-vehicle axis A2. The top panel 34 and/or the bottom panel 36 may be monolithic with one or more of the panels 60, 66, 68, 70 of the first inflated leg 28 and/or the second inflated leg 30. The top panel 34 and/or the bottom panel 36 may be fixed to one or more of the panels 60, 66, 68, 70 of the first inflated leg 28 and/or the second inflated leg 30, e.g., via stitching, adhesive, friction welding, etc.

The top panel 34 of the inflated arced member 32 may face the roof 22. For example, the top panel 34 may be between the roof 22 and the bottom panel 36. As another example, the top panel 34 may have an exterior surface, and a vector extending normally from the external surface may be toward the roof 22.

The bottom panel 36 of the inflated arced member 32 may face the floor 38. For example, the bottom panel 36 may be between the floor 38 and the top panel 34. As another example, the bottom panel 36 may have an exterior surface, and a vector extending normally from the exterior surface may be toward the floor 38.

The inflated arced member 32 may include an arced chamber 80. The arced chamber 80 may be defined by the top panel 34 and the bottom panel 36 of the inflated arced member 32, e.g., the arced chamber 80 may be between the top panel 34 and the bottom panel 36. The top panel 34 may be between the roof 22 and the arced chamber 80. The bottom panel 36 may be between the floor 38 and the arced chamber 80. The top panel 34 and the bottom panel 36 may extend generally in parallel with each other.

The airbag 26 may include a common inflation chamber 82. The common inflation chamber 82 may extend through the first inflated leg 28, the second inflated leg 30, and/or the inflated arced member 32. For example, the common inflation chamber 82 may include the first chamber 74, the second chamber 76, and the arced chamber 80. For example, the first chamber 74, the second chamber 76, and the arced chamber 80 may be in fluid communication with one another, e.g., such that inflation medium may flow from the first inflated leg 28 to the inflated arced member 32, from the second inflated leg 30 to the inflated arced member 32, and/or from the inflated arced member 32 to the first inflated leg 28 and/or the second inflated member. For example, the airbag 26 may include a vent between the first inflated leg 28 and the inflated arced member 32, and/or between the second inflated leg 30 and the inflated arced member 32. The vent may allow fluid flow in one direction or in two directions. For example, the first inflated leg 28 and/or the second inflated leg 30 may be open to the arced inflated member 32, e.g., at the inner panels 70 between the top panel 34 and bottom panel 36, as shown in FIG. 8.

Figure 8:
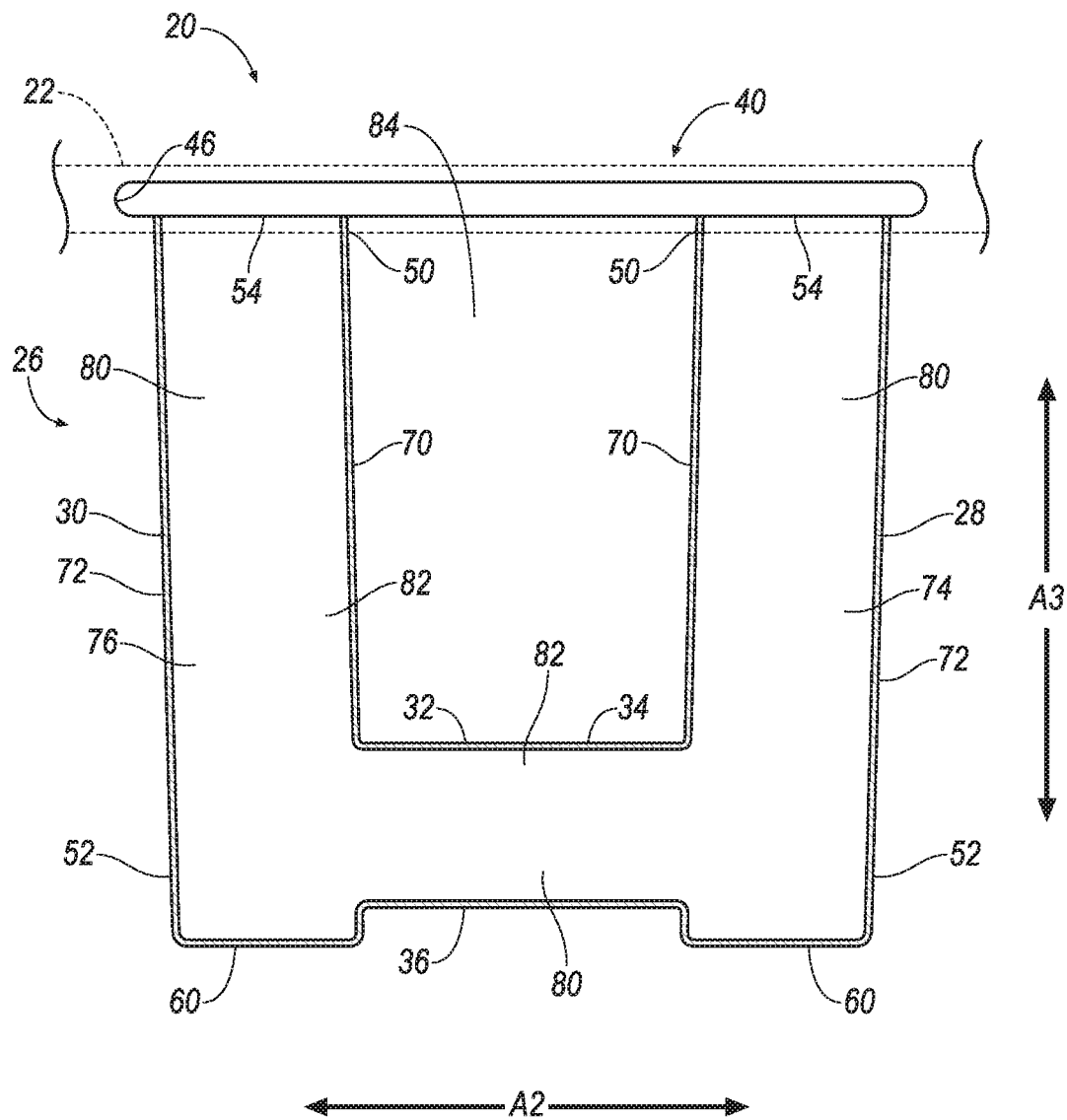
FIG. 8 is a cross-section view of the airbag of FIG. 3 taken along a cross-vehicle axis.
Figure 9:
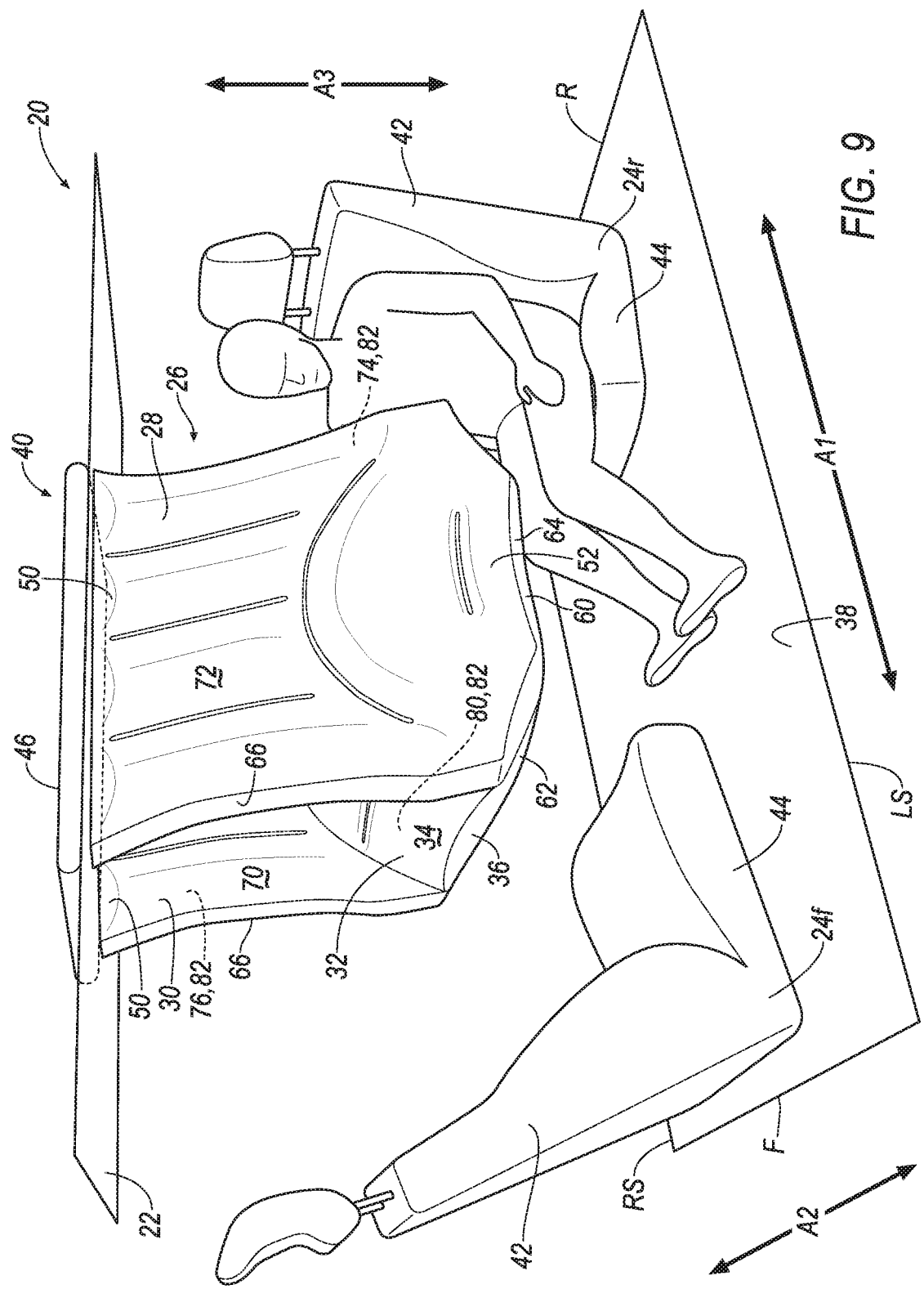
FIG. 9 is a perspective view of an interior of the vehicle of FIG. 1 with another embodiment of the airbag in an inflated position and an occupant in a rear seat.

The airbag 26 may define a gap 84, shown in FIG. 8. The gap 84 may be between the roof 22, the first inflated leg 28, the second inflated leg 30, and the inflated arced member 32. For example, the gap 84 may be between the roof 22 and the top panel 34 of the inflated arced member 32, and the inner panels 70 of the first inflated leg 28 and the second inflated leg 30. The gap 84 may be defined by the first inflated leg 28, the second inflated leg 30, and the inflated arced member 32. For example, the gap 84 may be between the inner panels 70 of the first inflated leg 28 and the second inflated leg 30 and adjacent the top panel 34 of the inflated arced member 32.

Figure 6:
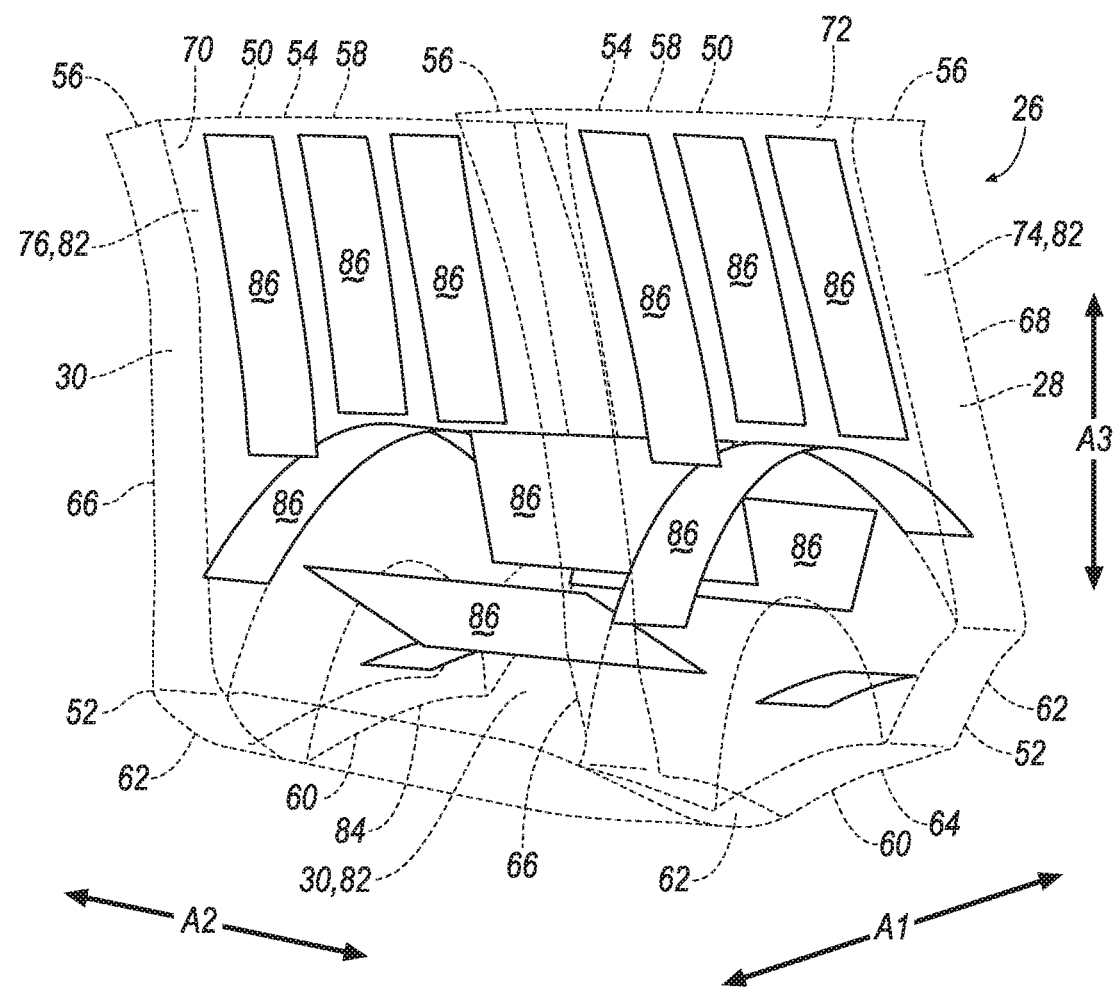
FIG. 6 is a perspective view of the airbag of FIG. 3 with some panels shown in phantom.
Figure 7:
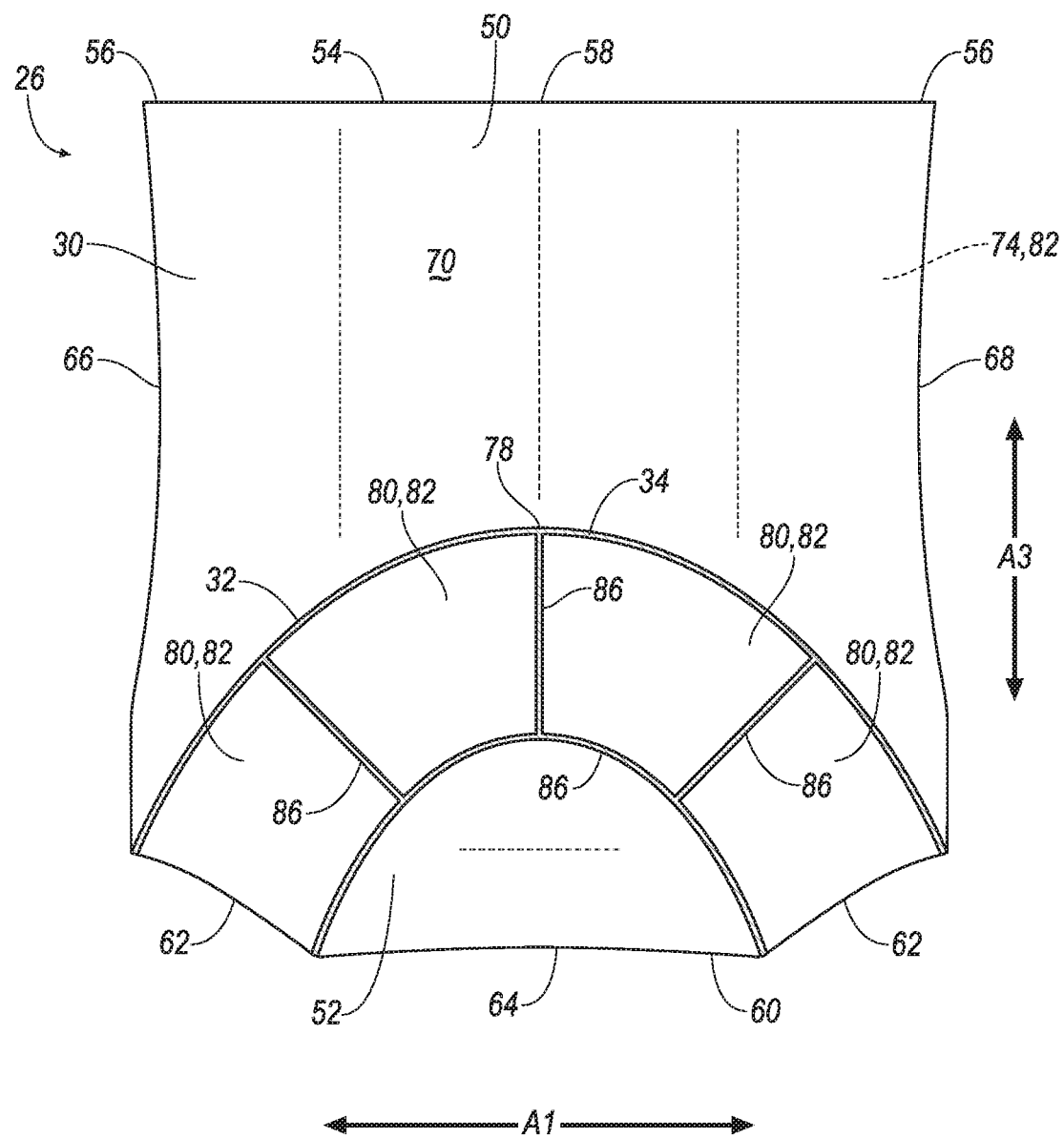
FIG. 7 is a cross-section view of the airbag of FIG. 3 taken along a vehicle-longitudinal axis.

The airbag 26 may include one or more internal tethers 86, shown in FIGS. 6, 7, and 12. The internal tethers 86 may be disposed in at least one of the first chamber 74, the second chamber 76, and the arced chamber 80. For example, one or more internal tethers 86 may extend from the inner panels 70 to the outer panels 72 of the first inflated leg 28 and the second inflated leg 30. For example, one or more internal tethers 86 may extend from the top panel 34 to the bottom panel 36 of the inflated arced member 32. The internal tethers 86 may be fixed to the panels 34, 36, 70, 72, e.g., via stitching, adhesive, friction welding, etc.

Figure 5:
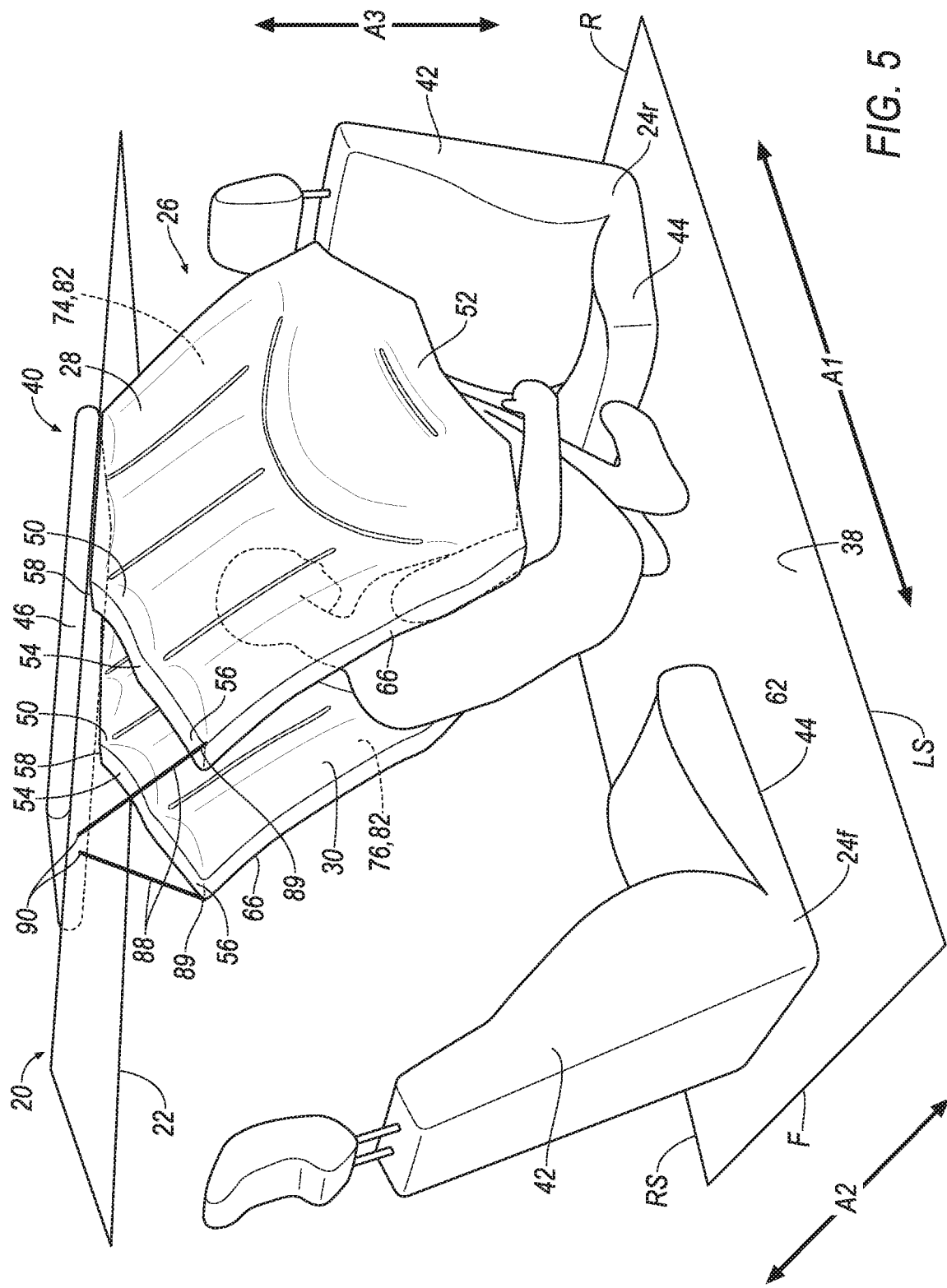
FIG. 5 is a perspective view of the interior of the vehicle of FIG. 3 during a vehicle rear impact.

The airbag 26 may include one or more external tethers 88, shown in FIGS. 5 and 11. The external tethers 88 may be outside the first chamber 74, the second chamber 76, and the arced chamber 80. The external tethers 88 may extend from the first inflated leg 28 and second inflated leg 30 to the roof 22. For example, the external tethers 88 may each include a first end 89 and a second end 90 spaced from the first end 89. The first end 89 may be fixed to the top panel 54 at the end portion 56, and/or to the front panel 66 or the rear panel 68, e.g., via stitching, adhesive, friction welding, etc. The second end 90 may be fixed to the roof 22, e.g., to the housing 46 supported by the roof 22, e.g., via one or more fasteners, adhesive, etc.

The external tethers 88 may be energy absorbing. For example, the external tethers 88 may be an elastic material that stretches to absorb energy, e.g., applied to the airbag 26 by the occupant during an impact of the vehicle 20. As another example, each external tether 88 may be folded and secured to itself with breakaway stitching, e.g., tension in the external tether 88 applied by the occupant contacting the airbag 26 during an impact of the vehicle 20 may cause the breakaway stitching to tear to permit the external tether 88 to unfold, absorbing energy applied to the tether.

The housing 46 may enclose and support components of the airbag assembly 40, e.g., the inflator 48, the airbag 26 in the uninflated position, etc. The housing 46 provides a reaction surface for the airbag 26 in the inflated position. The housing 46 may be supported by the roof 22 or other suitable component of the vehicle 20. The housing 46 may be formed of any material, e.g., a rigid polymer, a metal, a composite. The housing 46 may be positioned to inflate between the seats 24f, 24r. For example, the housing 46 may be supported by the roof 22 between the front seat 24f and the rear seat 24r, e.g., relative to the vehicle-longitudinal axis A1.

The inflator 48 provides inflation medium to inflate the airbag 26 from the uninflated position to the inflated position. The inflator 48 may be in fluid communication with the first inflated leg 28 and/or the second inflated leg 30, e.g., directly, through various piping, etc. The inflator 48 may be, for example, pyrotechnic inflator that use a chemical reaction to drive inflation medium to the airbag 26. The inflator 48 may be of any suitable type, for example, cold-gas inflators. The inflator 48 may be supported by the housing 46, the roof 22, or by any other suitable location of the vehicle 20. One or more inflator 48 may be used to inflate the airbag 26.

Figure 13:
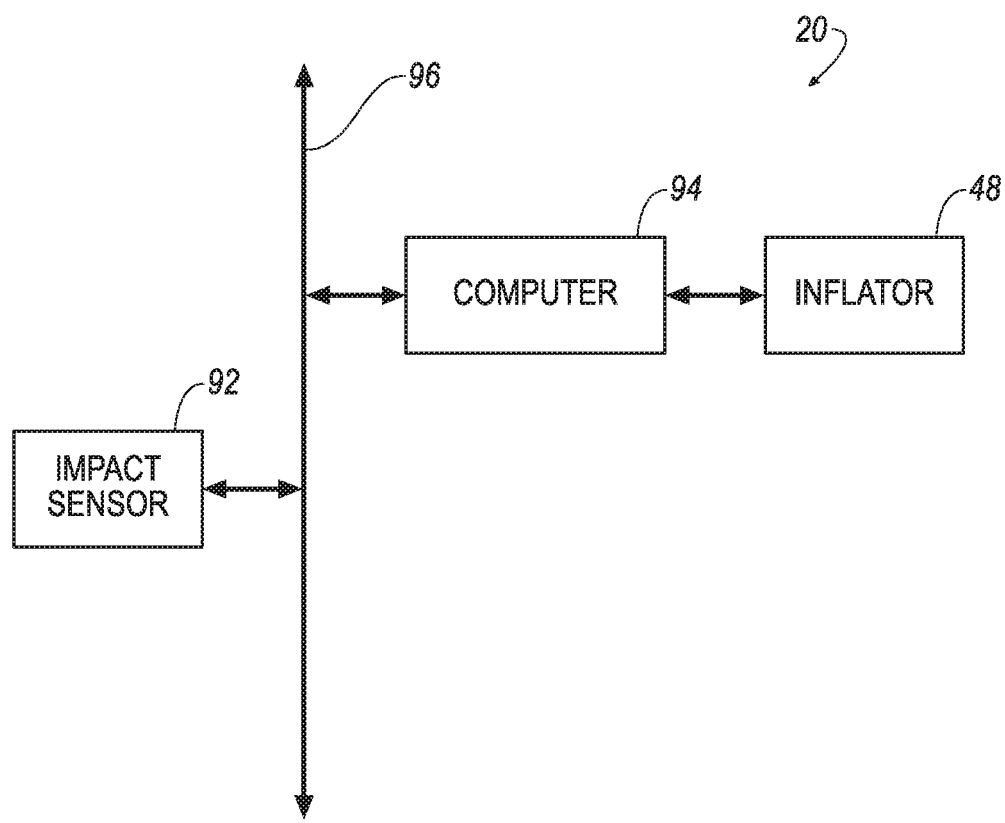
FIG. 13 is a block diagram of components of the vehicle of FIG. 1.

The vehicle 20 may include at least one impact sensor 92 for sensing impact of the vehicle 20, and a computer 94 in communication with the impact sensor 92 and the inflator 48, as shown in FIG. 13. The computer 94 may activate one or more inflators 48, e.g., by providing an impulse to a pyrotechnic charge of the inflator 48 when the impact sensor 92 senses an impact of the vehicle 20. Alternatively or additionally to sensing impact, the impact sensor 92 may be configured to sense impact prior to impact, i.e., pre-impact sensing.

The impact sensor 92 may be in communication with the computer 94. The impact sensor 92 is configured to detect an impact to the vehicle 20. The impact sensor 92 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 92 may be located at numerous points in or on the vehicle 20.

The computer 94 and the impact sensor 92 may be connected to a communication bus 96, such as a controller area network (CAN) bus, of the vehicle 20. The computer 94 may use information from the communication bus 96 to control the activation of the inflator 48. The inflator 48 may be connected directly to the computer 94, as shown in FIG. 13, or the inflator 48 may be connected via the communication bus 96.

The computer 94 may be a microprocessor-based computer implemented via circuits, chips, or other electronic components. For example, the computer 94 may include a processor, a memory, etc. The memory of the computer 94 may include memory for storing programming instructions executable by the processor as well as for electronically storing data and/or databases.

In operation, the airbag 26 is in the uninflated position under normal operating conditions of the vehicle 20. In the event of an impact, the impact sensor 92 may detect the impact and transmit a signal through the communication bus 96 to the computer 94. The computer 94 may transmit a signal through the communication bus 96 to the inflator 48. Upon receiving the signal, the inflator 48 may discharge and inflate the airbag 26 with the inflation medium from the uninflated position to the inflated position.

During the impact, momentum of the occupant seated in one of the seats 24f, 24r may cause the occupant to move forward toward the airbag 26 in the inflated position. Such movement may be transferred to the airbag 26, causing one of the end portions 56 to be spaced from the roof 22 and creating tension in the external tethers 88. The external tethers 88 may maintain the airbag 26 in position to restrain the occupant from further movement.

The adjectives "first" and "second" are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a roof;
a front seat and a rear seat facing each other;
an airbag inflatable from the roof to an inflated position between the front seat and the rear seat; and
the airbag, in the inflated position, including a first inflated leg, a second inflated leg spaced from the first inflated leg, and an inflated arced member spaced from the roof extending from the first inflated leg to the second inflated leg, the inflated arced member including a top panel and a bottom panel spaced from each other and each arcing downwardly.

2. The vehicle of claim 1, wherein the front seat and the rear seat are spaced from each other along a vehicle-longitudinal axis, and the first inflated leg and second inflated leg are spaced from each other along a cross-vehicle axis transverse to the vehicle-longitudinal axis.

3. The vehicle of claim 1, wherein the top panel and the bottom panel each extend from the first inflated leg to the second inflated leg.

4. The vehicle of claim 1, wherein the airbag includes a common inflation chamber extending through the first inflated leg, the second inflated leg, and the inflated arced member.

5. The vehicle of claim 1, wherein the first inflated leg has a first proximal end and the second inflated leg has a second proximal end, the first proximal end and the second proximal end being adjacent the roof and spaced from each other.

6. The vehicle of claim 5, wherein the first and second inflated legs have distal ends spaced from the first proximal end and the second proximal end, the distal ends being fixed to the inflated arced member.

7. The vehicle of claim 1, further comprising a floor, and wherein the top panel faces the roof and the bottom panel faces the floor.

8. The vehicle of claim 1, wherein a gap extending along a vehicle-longitudinal axis is defined by the roof, the first inflated leg, the second inflated leg, and the inflated arced member.

9. The vehicle of claim 1, wherein the airbag in the inflated position is spaced from both the front seat and the rear seat.

10. The vehicle of claim 1, wherein the inflated arced member includes an arced chamber, and wherein the airbag includes a tether disposed in the arced chamber and extending from the top panel to the bottom panel.

11. The vehicle of claim 1, further comprising tethers extending from the first and second inflated legs to the roof.

12. The vehicle of claim 1, wherein the first and second inflated legs each include a proximal end adjacent the roof and a distal end spaced from the roof, and wherein the first and second inflated legs extend in a vehicle-rearward direction from the proximal end to the distal end.

13. The vehicle of claim 1, wherein the first and second inflated legs each include a front panel having a first length and a rear panel having a second length that is less than the first length.

14. The vehicle of claim 1, wherein the first and second inflated legs each include a top panel having a center portion fixed relative to the roof and an end portion free from being fixed relative to the roof.

15. An airbag assembly comprising:
an airbag inflatable to an inflated position; and
the airbag, in the inflated position, including a first inflated leg, a second inflated leg spaced from the first inflated leg, the first inflated leg and the second inflated leg each extending from a proximal end to a distal end, and an inflated arced member extending from the first inflated leg to the second inflated leg, the inflated arced member including a top panel and a bottom panel spaced from each other and each arcing downwardly from an apex that is below the proximal ends and above the distal ends.

16. The airbag assembly of claim 15, wherein a gap is defined by the first inflated leg, the second inflated leg, and the inflated arced member.

17. The airbag assembly of claim 15, wherein the first inflated leg includes a first chamber, the second inflated leg includes a second chamber, and the inflated arced member includes an arced chamber, the first chamber, the second chamber, and the arced chamber all being in fluid communication with one another.

18. The airbag assembly of claim 17, wherein the airbag includes tethers disposed in the arced chamber and extending from the top panel to the bottom panel.

19. The airbag assembly of claim 15, wherein the top panel and the bottom panel extend from the first inflated leg to the second inflated leg.

* * * * *